June 3, 1930.　　　　C. D. FAGAN　　　　1,761,821
SELF CLOSING VALVE
Filed July 5, 1927　　　3 Sheets-Sheet 1

INVENTOR
Charles D. Fagan
BY
George Ramey
ATTORNEY

June 3, 1930. C. D. FAGAN 1,761,821
SELF CLOSING VALVE
Filed July 5, 1927 3 Sheets-Sheet 2
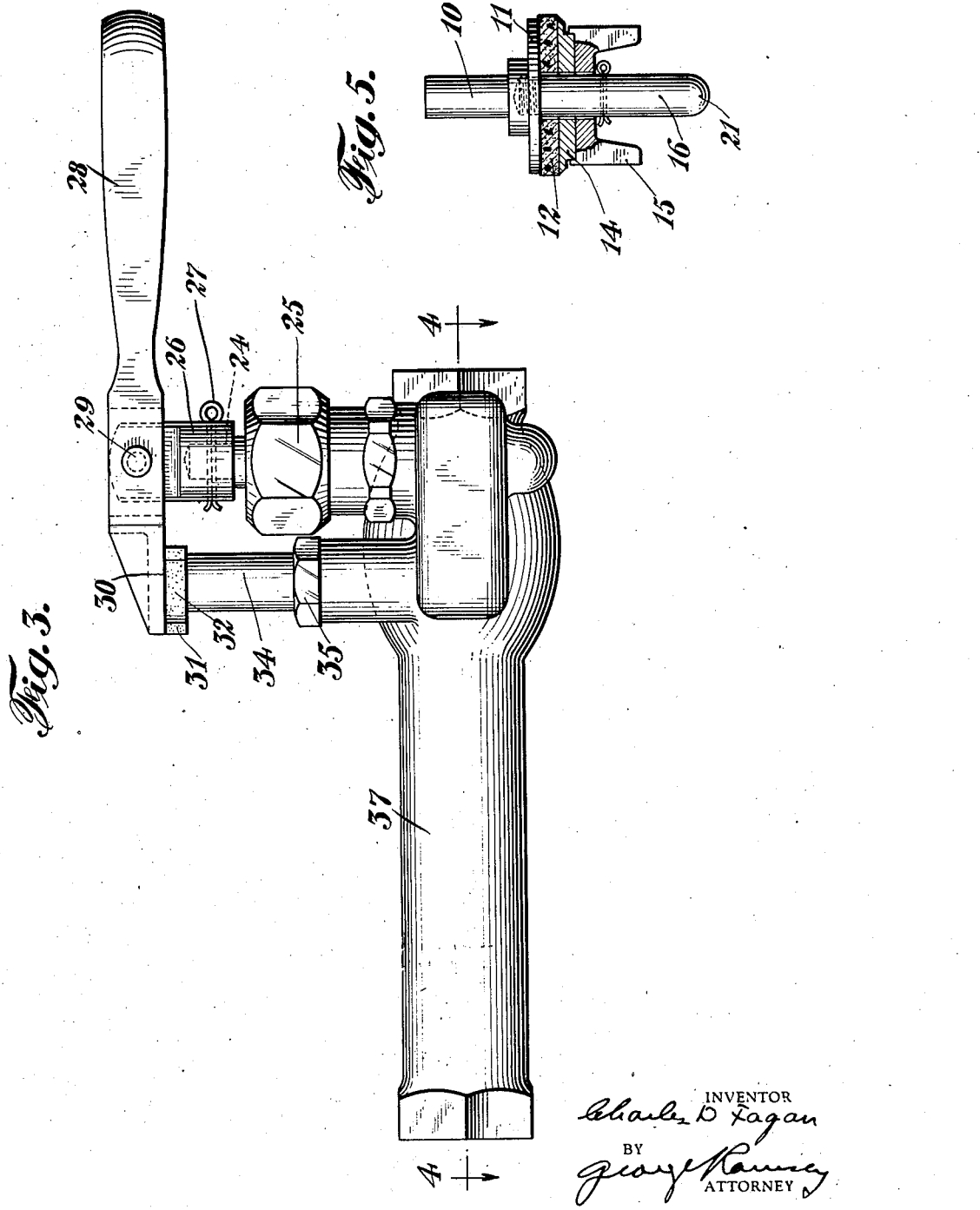
INVENTOR
Charles D Fagan
BY
George Ramsey
ATTORNEY June 3, 1930.　　　C. D. FAGAN　　　1,761,821
SELF CLOSING VALVE
Filed July 5, 1927　　　3 Sheets-Sheet 3
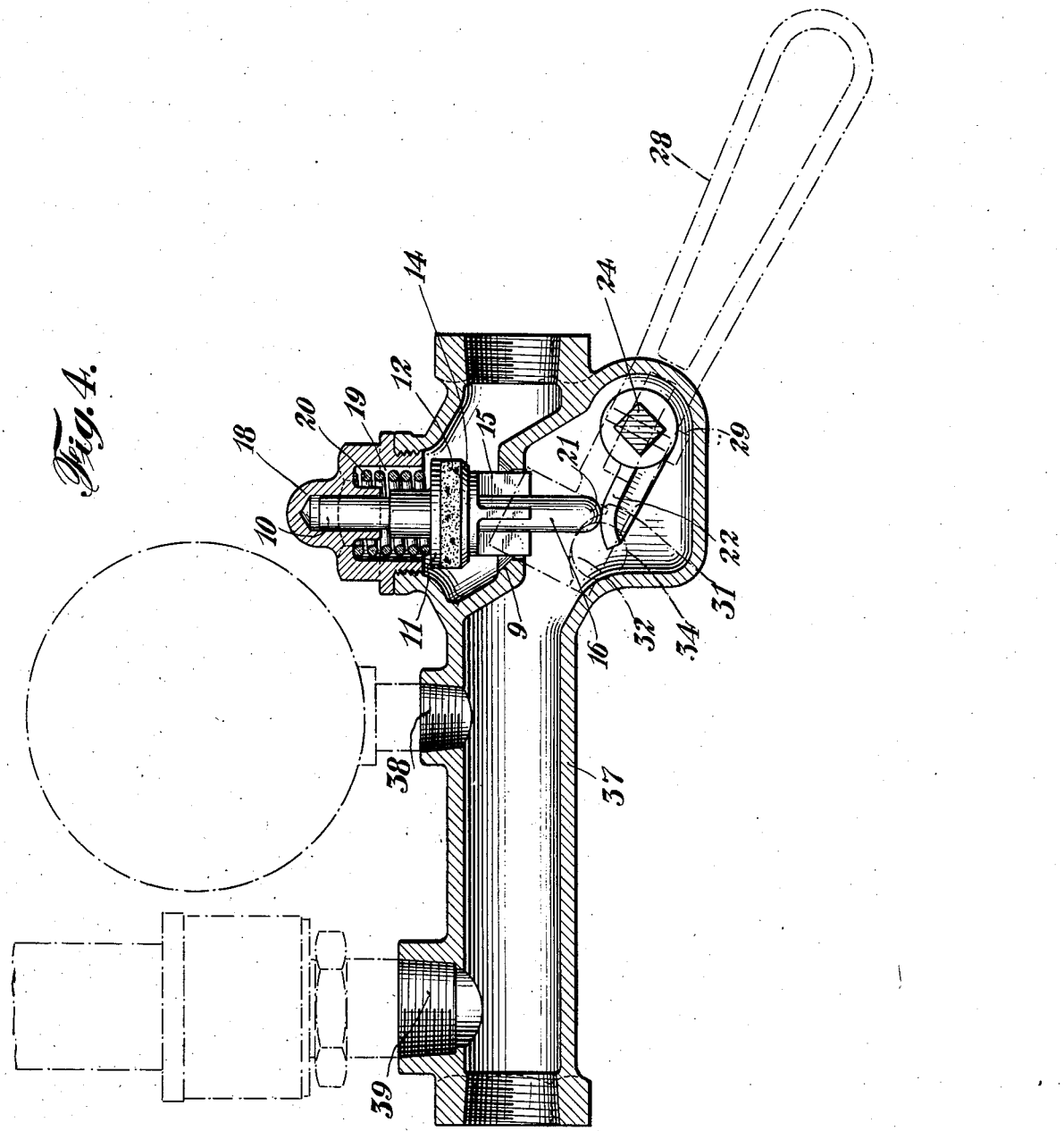
INVENTOR
Charles D. Fagan
BY
George Ramsey
ATTORNEY Patented June 3, 1930

1,761,821

UNITED STATES PATENT OFFICE

CHARLES D. FAGAN, OF SHARON, PENNSYLVANIA, ASSIGNOR TO SHARPSVILLE BOILER WORKS CO., OF SHARPSVILLE, PENNSYLVANIA, A CORPORATION OF PENNSYLVANIA

SELF-CLOSING VALVE

Application filed July 5, 1927. Serial No. 203,432.

The present invention relates broadly to valve structures and more especially to a valve structure adapted to be self closing under predetermined conditions. The structure embodying the present invention is used more especially in connection with gasolene service stations, although it is useful elsewhere.

This valve is provided with spring actuated closing means and is adapted to be easily tripped to permit self closing. It is also constructed with a fusible stop block adapted to release the valve when a predetermined temperature is reached in case of a flash back or fire.

Another feature of the present invention resides in the arrangement of a strainer or filter relative to the valve structure so that effective filtering is accomplished without substantial reduction in the flow of liquid through the valve.

Still further features of the present invention reside in a cork cushioned valve head and in the relation of the guides therefor, which insure positive and correct seating of the valve and prevent binding of the parts during operation.

It is realized that the present invention may be embodied in structures other than those disclosed herewith and therefore, the disclosure is to be understood as illustrative and not in the limiting sense.

Fig. 3 is an elevational view of the modified form of valve casing embodying the same valve structure as shown in Fig. 1.

Fig. 4 is a sectional view taken on line 4—4 of Fig. 3 and looking in the direction of the arrows.

Fig. 5 is a detail view of the valve member.

Figure 1:
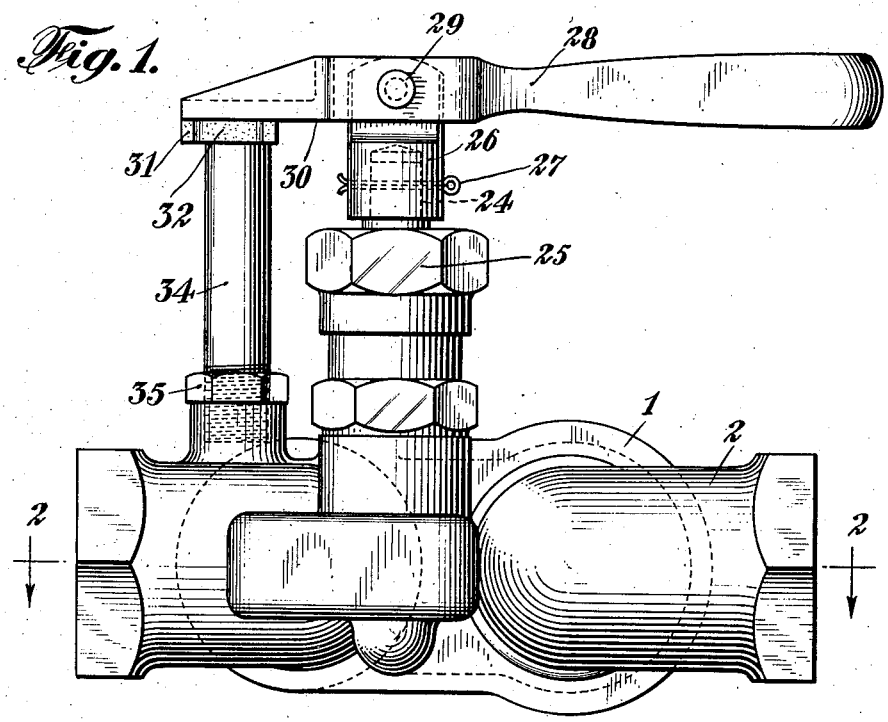
Fig. 1 is an elevational view of the outside of one form of the valve.
Figure 2:
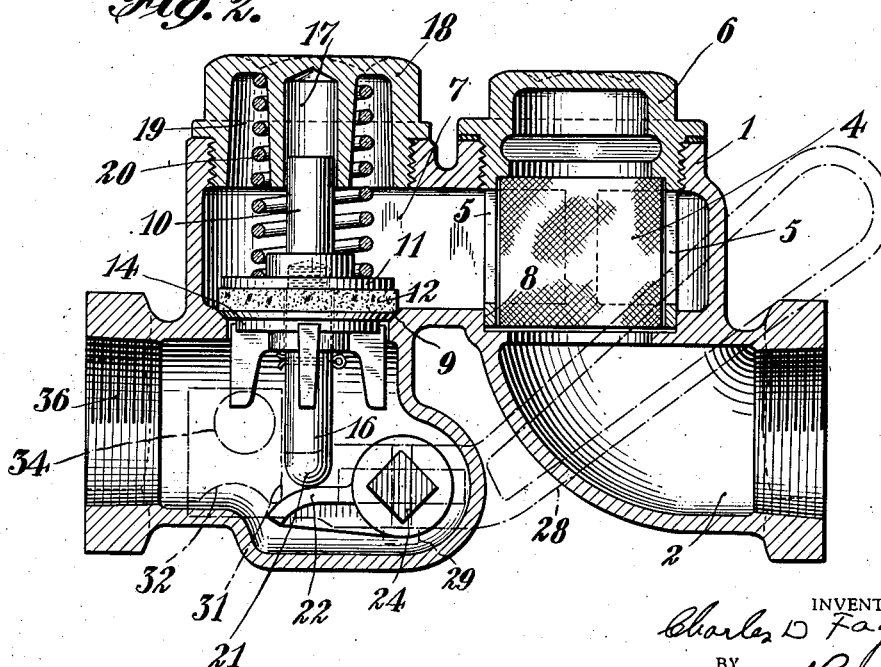
Fig. 2 is a sectional view taken on line 2—2 of Fig. 1, showing the valve parts in section.

Referring now to the drawings and more especially to Figs. 1 and 2, the valve casing 1 is provided with an inlet conduit 2 which leads into a hollow cylindrical screen 4 that is carried by a frame-work 5 integral with a cap nut 6 which is screw threaded into the casing 1. This cylindrical screen 4 comprises a partition between the inlet conduit 2 and the valve chamber 7, which surrounds the cylindrical screen and leads to the valve proper. The lower part of the frame work 5 is provided with a seat 8 that seats in a cylindrical opening formed in the casing 1 around the inner end of the inlet 2. This arrangement provides a very strong, positive construction which enables the screen 5 to function fully and does not impede the flow of liquid through the device in view of the fact that the total area of the openings in the screen is such as to substantially equal the area of the opening in the inlet conduit, and the valve chamber 7 is of sufficient size to likewise allow free flow of liquid in all radial directions from the sides of the screen. The mounting of the screen in the frame may be done in various ways. It may be retained merely by friction so that the screen may be easily taken out and cleaned or where desired, it may be soldered to the frame. The cap nut arrangement and the seat at the bottom of the frame facilitate removal of the screen for cleaning and also prevents leakage of liquid around the screen so that all of the liquid passing through the valve casing must pass through the screen.

A valve seat 9 is provided in the casing 1 preferably with the axis of the valve seat substantially parallel to the axis of the cylindrical screen 4. A valve head shown in detail in Fig. 5 is mounted to cooperate with the valve seat and comprises an upper guide stem 10 carrying a metal disk 11 which supports a cork disk 12 against a metal valve 14 adapted to seat upon the valve seat 9. A guiding spider 15 is mounted adjacent the metal valve and is provided with guiding fingers adapted to guide the valve in its movement. An operating stem 16 extends beneath the guide stem 10 and carries the metal valve 14 and the cork disk 12 in such manner as to allow a slight freedom of movement to the metal valve 14 so that this valve 14 may yield slightly to allow the cork disk to be effective as a cushion. The guide stem 10 loosely fits a guide opening 17 in the cap nut 18 to permit a reciprocating movement of the guide stem 10 in the opening 17. The cap nut is provided with a recess 19 to receive a coil spring 20 which bears upon the metal disk 11 on the guide stem 10, thereby tending to seat the metal valve 14 on the valve seat 9. It will be observed that this construction is such that the axis of the spring is coincident with the axis of the valve. The valve is accurately guided at the upper end by the guide stem 10 reciprocating in the guide opening 17 and at the lower end by the fingers of the spider 15 contacting with the sides of the opening in the casing below the valve seat, so that the valve always strikes the seat accurately and the cork cushion absorbs the shock as well as applying uniform pressure over the valve to hold it closed. The lower end 21 of the operating stem 16 is semi-spherical and cooperates with a curved operating arm 22 mounted upon a squared head on an operating shaft 24. This shaft 24 extends outwardly through a packing gland 25 and carries on its outer end a connection 26 which may be secured thereto by cotter key 27 or the like. A handle 28 is pivoted at 29 to the connection 26 in such manner as to permit a rocking movement of the handle in the plane of the axis of the operating shaft 24. The forward end of the handle 28 comprises a plane surface 30 to which is attached a locking lug 31 by means of fusible solder having a melting point at substantially 160° F. This temperature is above climatic temperature and is safely below ignition point of gasoline vapors. This locking lug has a recessed locking face 32 adapted to contact with a locking post 34 screw threaded into the casing 1 and locked in position by a lock nut 35.

It will be observed that by manipulating the handle 28 so that the locking lug 31 will pass the upper end of the locking post 34, the handle may be swung to rotate the operating shaft 24 whereby the operating arm 22 bearing upon the semi-spherical lower end 21 of the operating stem 16 forces the valve open and compresses the coil spring 20. The handle is then rotated on the pivot 29 to bring the locking lug 31 back of the locking post 34 and rotative pressure on the handle is released. The coil spring through the connected parts just described, forces the locking lug 31 tightly against the end of the locking post 30, thereby locking the valve open. In case it is necessary to quickly close the valve, the operator strikes the handle 28 toward the valve casing, thereby raising the locking lug 31 above the post 34 and the spring 20 snaps the valve closed. Also in case of a flare back or fire the solder melts, thereby freeing the lug 31 from the surface 30 and allowing the spring 20 to snap the valve closed. During this closing operation the valve is accurately guided as previously described by the guide stem 10 and the spider 15 so that the metal valve 14 pressed down by the cork disk accurately seats on the valve seat 9. In view of the freedom of movement allowed the metal valve upon the operating stem, the cork disk cushions the shock and permits this valve to accurately set on the seat. It has been found that cork retains its resilence longer than other elastic materials and is particularly well adapted for this use, since it is not affected by gasolene or gasolene vapors. When the valve is open, the liquid passing through the valve may go out through the outlet opening 36 in the casing 1. The axes of the outlet opening 36 and the inlet of the conduit 2 are aligned so that when the valve is in place, the pipe line system may be in a straight line.

Referring now to Figs. 3 and 4, the valve and operating mechanism is substantially identical with that just described and the same reference characters have been applied thereto so that a separate description of the valve disclosed in these figures is unnecessary. In the form disclosed in Figs 3 and 4, the screen is omitted and the valve casing on the outlet side is extended to comprise a manifold 37, which is provided with an outlet 38 adapted to carry a pressure gage and a second outlet 39 adapted to carry a safety valve. This manifold type of casing is particularly desirable for use in connection with gasolene service stations where the valve is installed on an air pressure line, which requires a safety gage and a safety valve.

The present type of valve is quick acting and positive in its operation and at the same time capable of being fully opened with a relatively small movement of the handle, and automatically closes in case of flareback or fire which may endanger the liquid or vapors normally passed by the valve.

Having described my invention, I claim:

1. A valve comprising a casing provided with a pair of openings, a screen member seat beneath one of said openings and a valve seat beneath the other of said openings, a screw cap adapted to close one of said openings and provided with an open framework adapted to support a screen and to permit fluids to pass through said framework, a screen supported substantially throughout its length by said frame, said casing being provided with a valve chamber beneath said openings, a valve adapted to be seated upon the valve seat, a cap screw adapted to close the opening over said valve seat, and means to operate said valve.

2. A self closing valve for gasoline service stations comprising a valve casing provided with a valve seat, a valve adapted to cooperate with said seat to close the passage through the valve casing, a spring normally tending to seat said valve on said valve seat, manually operable means to open said valve for service station operations, a stop carried by said valve casing and adapted to cooperate with a stop block to hold said valve open, a stop block secured to said manual means by low temperature fusible solder adapted to release said block from said manual means when the temperature of said block is raised above maximum atmospheric temperature and below temperature of ignition of gasolene vapors to render said block ineffective to oppose the action of said spring to close said valve, and means whereby said stop and said stop block may be engaged and disengaged at the will of the operator.

3. A self closing valve comprising a casing provided with a passageway and a valve seat in said passageway, a valve adapted to set on said valve seat and close said passageway, spring means normally tending to seat said valve member against said valve seat, manually operable means for opening said valve, said manually operable means comprising a rotatable shaft and a handle pivoted upon said shaft with the axis of the pivot at right angles to the axis of the shaft, and stop means for holding said valve open, said stop means comprising a stop member carried by said casing and a second stop member upon said pivoted handle, said handle being oscillatable on said pivot to bring said stop means and said stop member into and out of operative relation to each other.

4. A self closing valve comprising a casing having a passageway therethrough and a valve seat in said passageway, a valve adapted to set on said seat to close the passageway, a spring normally acting to seat said valve upon said valve seat, manually operable means to raise said valve from said seat against the action of said spring, and a pair of stop members adapted to lock said valve in raised position from said seat, and means whereby said stop members may be engaged and disengaged at the will of the operator, one of said stop members being anchored by low temperature fusible solder whereby an abnormally high temperature will effect the release of the stop member and thus initiate closing of the valve.

5. A self closing valve comprising a casing provided with a valve seat; a valve head adapted to engage said seat; spring means operative to bias said valve head into closed position; means manually operable to open the valve against the action of said spring means; locking means to lock said manually operable means in position to retain said valve open, said locking means comprising a stop block adapted to engage detent means, the stop block being secured by solder fusible at a temperature above the maximum atmospheric temperature and below the ignition temperature of gasoline vapors, whereby melting of the solder releases the stop block and thus initiates closing of the valve, and manually operated means to render said locking means effective or ineffective at the will of the operator.

6. A self closing valve comprising a casing provided with a valve seat; a valve head adapted to engage said seat; spring means operative to bias said valve head into closed position; a rotatable element operative to open the valve against the action of the spring; and a handle attached to said rotatable element for manually rotating the same, said handle being pivoted to permit a rocking motion on an axis perpendicular to the axis of said rotatable element and said handle and valve casing comprising interlocking portions adapted to be brought into engagement by rocking the handle to lock the valve in its open position.

7. A self closing valve comprising a casing provided with a valve seat; a valve head adapted to engage said seat; spring means operative to bias said valve head into closed position; a rotatable element operative to open the valve against the action of the spring; and a handle attached to said rotatable element for manually rotating the same, said handle being pivoted to permit a rocking motion on an axis perpendicular to the axis of said rotatable element and said handle and valve casing comprising interlocking portions adapted to be brought into engagement by rocking the handle to lock the valve in open position, at least one of said interlocking means being designed to fail at a predetermined temperature whereby the valve is released and closes automatically when the predetermined temperature is reached.

CHAS. D. FAGEN.